United States Patent
Krishnamurthy et al.

(10) Patent No.: US 9,438,676 B2
(45) Date of Patent: Sep. 6, 2016

(54) SPECULATIVE DATA PROCESSING OF STREAMING DATA

(71) Applicant: Cisco Technology, Inc., San Jose, CA (US)

(72) Inventors: Saileshwar Krishnamurthy, Palo Alto, CA (US); Madhu Kumar, San Mateo, CA (US); Amit Bhat, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 230 days.

(21) Appl. No.: 14/341,436

(22) Filed: Jul. 25, 2014

(65) Prior Publication Data

US 2016/0026530 A1    Jan. 28, 2016

(51) Int. Cl.
| | |
|---|---|
| *G06F 11/00* | (2006.01) |
| *H04L 29/08* | (2006.01) |
| *G06F 11/07* | (2006.01) |
| *G06F 11/14* | (2006.01) |
| *G06F 9/46* | (2006.01) |

(52) U.S. Cl.
CPC ........... *H04L 67/1097* (2013.01); *G06F 9/466* (2013.01); *G06F 11/0796* (2013.01); *G06F 11/1402* (2013.01); *G06F 11/1438* (2013.01); *G06F 11/1471* (2013.01); *G06F 11/1474* (2013.01); *G06F 2201/805* (2013.01)

(58) Field of Classification Search
CPC ..................... G06F 11/1438; G06F 11/07793; G06F 11/1471; G06F 11/1474; G06F 11/1402
See application file for complete search history.

(56) References Cited

U.S. PATENT DOCUMENTS

| 7,383,253 | B1 | 6/2008 | Tsimelzon et al. |
| 7,818,313 | B1 | 10/2010 | Tsimelzon et al. |

(Continued)

OTHER PUBLICATIONS

U.S. Appl. No. 13/344,559, filed Jan. 5, 2012, Notice of Allowance, Jan. 22, 2014.

(Continued)

*Primary Examiner* — Charles Ehne
(74) *Attorney, Agent, or Firm* — Hickman Palermo Becker Bingham LLP

(57) ABSTRACT

In an embodiment, a method comprises receiving a plurality of source data records from one or more source computers, wherein one or more first source data records are associated with a first source transaction and one or more second source data records are associated with a second source transaction; generating a first derived transaction comprising one or more first derived records based on the plurality of source data records; generating a first transaction mapping between the first derived transaction and the first source transaction; generating a second transaction mapping between the first derived transaction and the second source transaction; determining that the first derived transaction has ended, and in response, committing first derived transaction including the one or more first derived records to a persistent storage; receiving a first ending punctuation associated with the first source transaction, and in response, committing the first source transaction including the one or more first source data records associated with the first source transaction to the persistent storage; after committing the first derived transaction, determining that the second source transaction failed, and in response: determining that the first derived transaction should be regenerated based on the second transaction mapping, and in response, regenerating the first derived transaction.

18 Claims, 5 Drawing Sheets

(56) References Cited

U.S. PATENT DOCUMENTS

| | | | |
|---|---|---|---|
| 7,984,043 B1 | 7/2011 | Waas | |
| 8,601,458 B2* | 12/2013 | Andrade | G06F 8/433 717/155 |
| 2002/0143728 A1 | 10/2002 | Cotner et al. | |
| 2007/0240061 A1 | 10/2007 | Cormode et al. | |
| 2009/0228434 A1 | 9/2009 | Krishnamurthy et al. | |
| 2009/0228465 A1 | 9/2009 | Krishnamurthy et al. | |
| 2010/0131745 A1* | 5/2010 | Meijer | G06F 9/4812 712/244 |
| 2011/0131199 A1 | 6/2011 | Simon et al. | |
| 2011/0145828 A1 | 6/2011 | Takahashi et al. | |
| 2011/0167148 A1 | 7/2011 | Bodziony et al. | |
| 2011/0179228 A1* | 7/2011 | Amit | G06F 3/0608 711/135 |
| 2011/0208703 A1 | 8/2011 | Fisher et al. | |
| 2011/0302164 A1 | 12/2011 | Krishnamurthy et al. | |
| 2011/0314019 A1 | 12/2011 | Jimenez Peris et al. | |
| 2012/0078975 A1 | 3/2012 | Chen et al. | |
| 2012/0110042 A1* | 5/2012 | Barsness | G06F 17/30289 707/825 |
| 2012/0297249 A1* | 11/2012 | Yang | G06F 9/5072 714/19 |
| 2013/0054537 A1 | 2/2013 | Das et al. | |
| 2013/0275452 A1 | 10/2013 | Krishnamurthy | |
| 2014/0012877 A1 | 1/2014 | Krishnamurthy | |
| 2014/0032535 A1 | 1/2014 | Singla | |
| 2014/0280325 A1 | 9/2014 | Krishnamurthy et al. | |
| 2014/0379712 A1 | 12/2014 | LaFuente Alvarez | |
| 2016/0026663 A1 | 1/2016 | Krishnamurthy | |

OTHER PUBLICATIONS

U.S. Appl. No. 13/344,562, filed Jan. 5, 2012, Office Action, Jun. 14, 2013.
U.S. Appl. No. 13/344,559, filed Jan. 5, 2012, Final Office Action, Jan. 16, 2013.
U.S. Appl. No. 13/344,559, filed Jan. 5, 2012. Office Action, Jun. 13, 2012.
U.S. Appl. No. 13/344,559, filed Jan. 5, 2012, Interview Summary, Apr. 23, 2014.
U.S. Appl. No. 13/344,562, filed Jan. 5, 2012, Office Action, Jun. 14, 2012.
U.S. Appl. No. 13/865,054, filed Apr. 17, 2013, Office Action, Feb. 20, 2015.
U.S. Appl. No. 13/839,148, filed Mar. 15, 2013, Office Action, Mar. 26, 2015.
U.S. Appl. No. 13/865,054, filed Apr. 17, 2013, Final Office Action, Jun. 4, 2015.
European Patent Office, "Search Report" in application No. PCT/US2015/040734, dated Nov. 3, 2015, 12 pages.
European Claims in application No. PCT/US2015/040734, dated Nov. 2015, 7 pages.
Cranor et al., "Gigascope" Proceedings of the 2003 ACM Sigmod International Conference on Management Data, dated Jan. 1, 2003, 23 pages.
Arasu et al., "The CQL Continuous Query Language: Semantic Foundations and Query Execution", The VLDB Journal dated 2006, 22 pages.
U.S. Appl. No. 13/865,054, filed Apr. 17, 2013, Notice of Allowance, Sep. 17, 2015.
U.S. Appl. No. 13/839,148, filed Mar. 15, 2013, Final Office Action, Oct. 21, 2015.
International Searching Authority, "Search Report" in application No. PCT/US2015/040735, dated Oct. 20, 2015, 10 pages.
Claims in application No. PCT/US2015/040735, dated Oct. 2015, 6 pages.
Tucker, Peter A. et al., "Exploiting Punctuation Semantics in Continuous Data Streams", IEEE Transactions on Knowledge and Data Engineering.
T. Johnson et al., "A Heartbeat Mechanism and its Application in Gigascope", Proceedings of the 31ST VLDB Conference.
Nalamwar, A., "Blocking Operators and Punctuated Data Streams in Continuous Query Systems" Compter Science.
Krishnamurthy, Sailesh et al., TelegraphCQ: Continuous Dataflow Processing for an Uncertain World, Proceddings of the 1st CIDR Conference, Asilmoar, dated 2003.
Krishnamurthy, Sailesh et al., TelegraphCQ: An Architectural Status Report., Bulletin of the IEEE Computer Society Technical Committee on Data Engineering, dated Nov. 18, 2003.
Krishnamurthy, Sailesh et al., "The Case for Precision Sharing.", Proceedings of the 30th VLDB Conference, Toronto, Canada, dated 2004.
Krishnamurthy, Sailesh et al., "Shared Hierarachical Aggeration for Monitoring Distributed Streams", Report No. UCB/CSD-05-1381, dated Oct. 18, 2005.
Krishnamurthy, Sailesh et al., "On-the-Fly Sharing for Streamed Aggregation.", SIGMOD Conference 2006, Chicago, Illinois, dated Jun. 27-29, 2006.
Franklin et al., "Design Considerations for High Fan-in Systems: the HiFi Approach." Proceedings of the 29th VLDB Conference, Berlin Germany, dated 2003.
Altinel et al., "Cache Tables: Paving the Way for an Adaptive Database Cache.", Proceedings of the 29th VLDB Conference, Berlin, Germany, dated 2003.
"Shared Query Processing in Data Streaming Systems", by Saileshwar krishnamurthy, fall 2006, http://citeseerx.ist.psu.edu/viewdoc/download?Doi=10.1.1.122.1989&rep1&type=pdf.
U.S. Appl. No. 13/936,922, filed Jul. 8, 2013, Notice of Allowance, Oct. 21, 2014.

* cited by examiner

SPECULATIVE DATA PROCESSING OF STREAMING DATA

FIELD OF THE DISCLOSURE

The present disclosure relates to computers and computer-implemented techniques useful in management of computer networks including network management databases relating to analytics. The disclosure relates more specifically to techniques for eagerly processing continuous queries of network management data and correcting for late arriving data or failures.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Data communication networks may comprise a hierarchy of "nodes" that receive, process, and send data streams to each other. A data stream may be an unbounded set of data sent over time. For example, a "source" node may send an unbounded set of data ("source" data) to a "processing" node. The processing node may process the source data as it is received, generate a new, unbounded set of "derived" data based on the source data, and send the derived data to a downstream node. The hierarchy may be referred to as a "workflow" or "streaming workflow".

A streaming workflow may have many advantages. For example, in a streaming workflow, each node may generate and send derived data based on source data, as the source data is received, thus reducing latency.

Building a robust and recoverable streaming workflow, however, may be challenging. For example, a processing node may receive source data that is late or out of order. A source node may send some partial amount of source data to a processing node before terminating the source stream unexpectedly. Accordingly, the processing node may generate and send derived data based on the out of order or incomplete source data.

One possible approach is to cause the processing node to delay processing the source data until the source data is determined to be complete. Then, the processing node may reorder data as needed and process the data. However, that approach may increase latency to unacceptable levels. For example, a node may process time-critical data, such as networking, power, or rocket telemetry data. If a processing node is forced to wait to receive additional source data from a source node, a downstream processing node or device may be unable to perform its functions properly or may derive misleading data from the lack of data received for the suspended node. For example, the downstream node or device may determine that a network is down or a rocket has lost contact, however the source data not yet sent may indicate that a network has excellent connectivity with one or more other networks or that a rocket is performing within mission parameters. Furthermore, the processing node may still receive exceptionally late source data, which cannot be incorporated into the derived data already generated and sent.

Errors earlier in a streaming workflow may drastically affect data generated later in the streaming workflow. For example, if a first processing node receives source data after generating and sending the derived data downstream, then the derived data may be inaccurate or false. Further downstream-processing nodes may generate additional derived data based on the inaccurate or false derived data generated upstream. The additional derived data may therefore also be inaccurate or false. Thus, gracefully and efficiently processing data in a streaming workflow is valuable.

Figure 1:
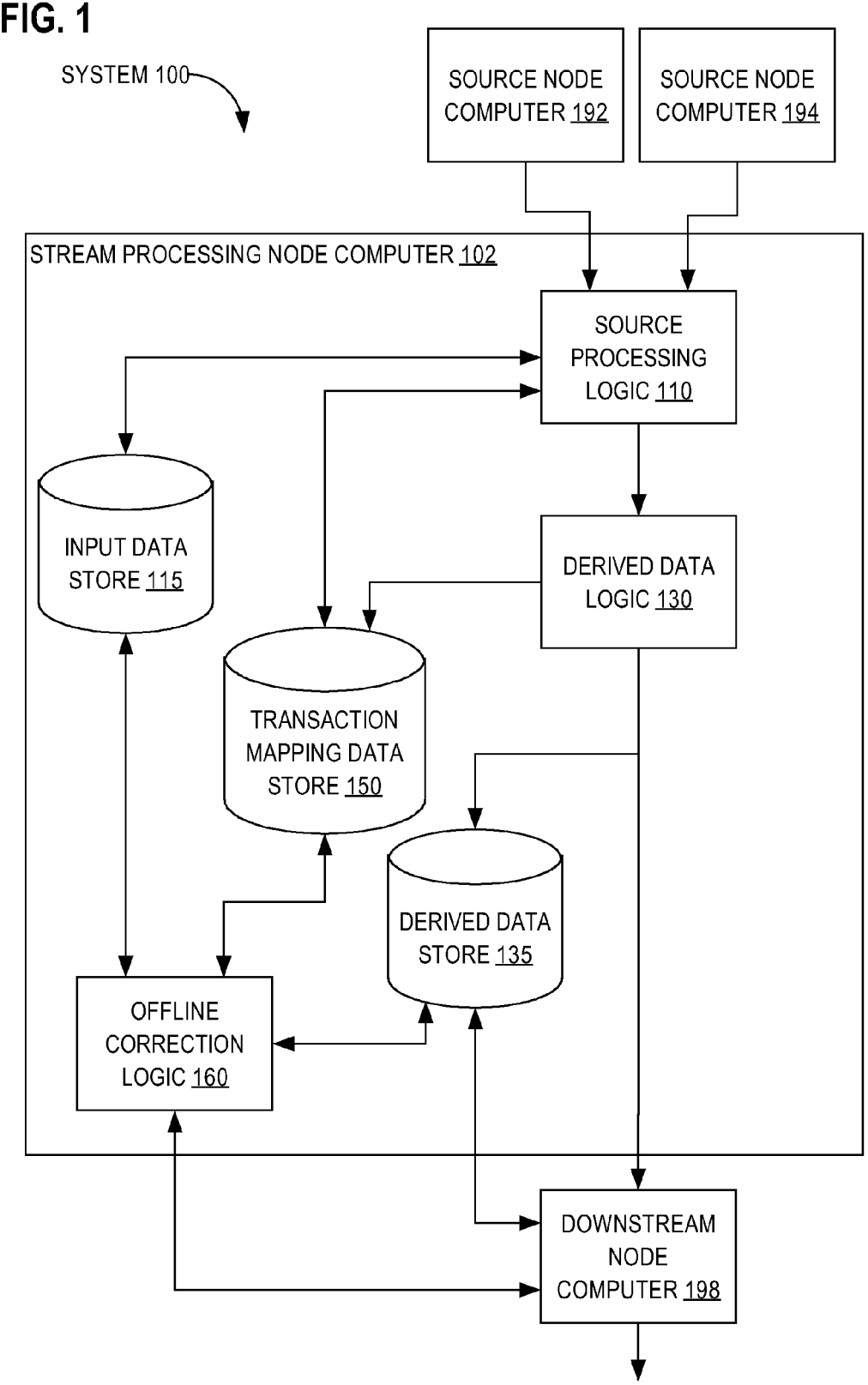
FIG. 1 illustrates a system for processing data in a streaming workflow, in an example embodiment.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

Techniques for distributing and processing independent data streams over one or more networks are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
  2.0 Structural and Functional Overview
    2.1 Transactions
      2.1.1 Punctuations
      2.1.2 Assigning Records to Transactions
    2.2 Example Multi-Node Streaming Workflow
      2.2.1 Source Processing Logic
      2.2.2 Derived Data Logic
      2.2.3 Transaction Mapping Data Store
      2.2.4 Offline Correction Logic
  3.0 Process Overview
    3.1 Generating Transactions
    3.2 Processing a Source Record
    3.3 Generating Derived Transactions
    3.4 Committing a Source Transaction
    3.5 Determining a Source Transaction has Failed
    3.6 Regenerating Derived Transactions
    3.7 Recovering for Processing Node Failure 4.0 Additional Example According to an Example Embodiment
   4.1 Reconciling a Failed Source Stream
   4.2 Recovering from System Failure
   4.3 Reconciling a Late Source Record
5.0 Implementation Mechanisms—Hardware Overview
6.0 Extensions and Alternatives

1.0 OVERVIEW

In an embodiment, a computer system comprises a memory; a processor coupled to the memory; processing logic coupled to the memory and the processor and configured to: receive a plurality of source data records from one or more source computers, wherein one or more first source data records are associated with a first source transaction and one or more second source data records are associated with a second source transaction; generate a first derived transaction including one or more first derived records based on the plurality of source data records; generate a first transaction mapping between the first derived transaction and the first source transaction; generate a second transaction mapping between the first derived transaction and the second source transaction; determine that the first derived transaction has ended, and in response, commit first derived transaction including the one or more first derived records to a persistent storage; receive a first ending punctuation associated with the first source transaction, and in response, commit the first source transaction including the one or more first source data records associated with the first source transaction to the persistent storage; after committing the first derived transaction, determine that the second source transaction failed, and in response: determine that the first derived transaction should be regenerated based on the second transaction mapping, and in response, regenerate the first derived transaction by: generating one or more second derived records that are based on the one or more first source data records but not the one or more second source data records; committing the one or more second derived records to the persistent storage.

In an embodiment, a method comprises receiving a plurality of source data records from one or more source computers, wherein one or more first source data records are associated with a first source transaction and one or more second source data records are associated with a second source transaction; generating a first derived transaction comprising one or more first derived records based on the plurality of source data records; generating a first transaction mapping between the first derived transaction and the first source transaction; generating a second transaction mapping between the first derived transaction and the second source transaction; determining that the first derived transaction has ended, and in response, committing first derived transaction including the one or more first derived records to a persistent storage; receiving a first ending punctuation associated with the first source transaction, and in response, committing the first source transaction including the one or more first source data records associated with the first source transaction to the persistent storage; after committing the first derived transaction, determining that the second source transaction failed, and in response: determining that the first derived transaction should be regenerated based on the second transaction mapping, and in response, regenerating the first derived transaction by: generating one or more second derived records that are based on the one or more first source data records but not the one or more second source data records; committing the one or more second derived records to the persistent storage.

In an embodiment, the method comprises after committing the one or more first derived records, receiving a late source record that is associated with the first source transaction; determining that the late source record should have been processed with the first derived transaction based on the first transaction mapping between the first source transaction and the first derived transaction, and in response, flagging the first derived transaction to be regenerated.

In an embodiment, the method comprises associating the one or more first derived records with an identifier that identifies the first derived transaction; in response to determining that the first derived transaction has ended, sending the one or more first derived records to a downstream device with the identifier; in response to determining that the second source transaction failed and generating the one or more second derived records: associating the one or more second derived records with the identifier; notifying the downstream device that the first derived transaction, which is associated with the identifier, was regenerated.

2.0 STRUCTURAL AND FUNCTIONAL OVERVIEW

One or more systems and methods are discussed herein to process data in a streaming workflow by minimizing latency using speculative data processing and propagating corrections to derived data throughout a workflow. A workflow comprises one or more source nodes and one or more processing nodes. A node may be a module, computer, computer component, computing device, database, data store, router, switch, and/or other element of internetworking infrastructure. A node may include logic and/or instructions, which when executed perform one or more of the methods discussed herein. A node may be defined by circuitry, one or more software instructions, a query, and/or a continuous query.

A continuous query is a query for data, including a query against a database, which defines one or more functions to perform on streaming input data. The one or more functions defined by a continuous query may be database specific functions, networking functions, multimedia functions, or any other streaming data functions. For example, a continuous query may specify summarizing, aggregating or filtering network analytics data in a network management application. Furthermore, a continuous query may define the frequency at which records are sent to subsequent nodes, storage, memory, or other continuous queries. In contrast with a traditional database, where data waits to be queried, a continuous query waits for data to arrive, in order to processes the data, and outputs the derived, processed data.

A source node may be a node the sends a data stream to one or more nodes. Data streams may comprise one or more records sent over time. A record may include electronic data, such as network latency, router connectivity, or rocket telemetry. The data in a record may be organized according to a standard and/or proprietary schema. For purposes of illustrating clear examples, a data stream from a source node may be referred to herein as a "source stream", and a record received from a source node may be referred to herein as a "source record".

A processing node may be a node that receives one or more source data streams, processes the source records, and generates one or more new data streams based on the source records. For purposes of illustrating clear examples, a data stream generated by a processing node may be referred to herein as a "derived stream", and a record generated by a processing node may be referred to herein as a "derived record". A processing node may also be a source node for a processing down that is downstream in the streaming workflow.

2.1 Transactions

A data stream may comprise one or more transactions. A transaction may include one or more records, which constitute a complete dataset. For example, a router may be a source node that sends network telemetry data to a processing node, such as a network administrator's computer. The router may send a transaction each second comprising three records: a first record indicating an average network throughput, a second record indicating an average network latency and a third record indicating the total number of currently connected devices. Records in the same transaction may be sent separately over time.

A transaction received from a source node may be referred to herein as a "source transaction". A transaction generated by a processing node may be referred to herein as a "derived transaction".

2.1.1 Punctuations

Transactions in a data stream may be demarcated by one or more "punctuations". A punctuation may include data that identifies a transaction. For example, a punctuation may include a transaction identifier, such as a unique number and/or timestamp. Data in a punctuation may be organized according to a standard and/or proprietary schema. The schema of a punctuation may be different than the schema of the records in a transaction that the punctuation demarcates.

A source node may send a punctuation to indicate the beginning of a transaction (referred to herein as a "beginning punctuation") and/or the end of a transaction (referred to herein as an "ending punctuation"). An ending punctuation may include data that identifies a beginning punctuation, such as a matching transaction identifier.

A single punctuation may indicate both the end of a first transaction and the beginning of a second transaction. For example, if a processing node receives a first punctuation with a first transaction identifier, and later receives a second punctuation with a second transaction identifier, then the processing node may perform one or more of the methods discussed herein associated with receiving an ending punctuation and one or more of the method discussed herein associated with receiving a beginning punctuation.

A punctuation may be sent as part of a record. For example, a record may include an extra field, which need not be included in one or more other records, indicating that the record is the beginning and/or end of a transaction.

A transaction may be empty and need not include a record. Thus, an ending punctuation may be sent after a beginning punctuation is sent, without sending one or more records. Likewise, an ending punctuation may be received after a beginning punctuation is received, without receiving one or more records.

2.1.2 Assigning Records to Transactions

A processing node may determine which transaction(s) a source record corresponds with based on data in the source record. For example, a processing node may receive a beginning punctuation that has a time range. Each record may include a field that identifies a time. Each record with a time that fits within the time range may be assigned to the transaction demarcated by the beginning punctuation. Additionally or alternatively, a punctuation may include a transaction identifier, and each record with the transaction identifier may be assigned the corresponding transaction by a source node and/or a processing node.

Additionally or alternatively, a processing node may determine which transaction(s) a source record belongs to implicitly. For example, a processing node may receive a beginning punctuation indicating the start of a particular transaction, followed by one or more records, and followed by an ending punctuation. The processing node may assign each source record received between the beginning punctuation and the ending punctuation to the particular transaction. The processing node may assign a source record to a source transaction using one or more techniques. For example, a processing node may add a field to a source record with the transaction identifier of the corresponding source transaction.

Records in the same transaction may, but need not, be sent together. For example, a source node may send a beginning punctuation, followed by one or more records over time. Subsequently, the source node may send an ending punctuation.

2.2 Example Multi-Node Streaming Workflow

FIG. 1 illustrates a system for processing data in a streaming workflow, in an example embodiment. In FIG. 1, system 100 includes source node computer 192, source node computer 194, stream processing node computer 102, and downstream node computer 198, communicatively coupled over one or more computer networks. A computer may be one or more software modules, computers, computer components, computing devices, databases, data stores, routers, switches, and/or other elements of internetworking infrastructure. Unless expressly stated as a "single" computer, a computer may be one or more computers.

While one or more of the components listed above may be illustrated as if running on a separate, remote computer from each other, one or more of the components listed above may be part of and/or executed on the same computer. For example, source node computer 192, stream processing node computer 102, and/or downstream node computer 198, and/or any of the devices, logic, and/or modules included therein, may be executed on the same, single computer, local area network, and/or wide area network.

Figure 5:
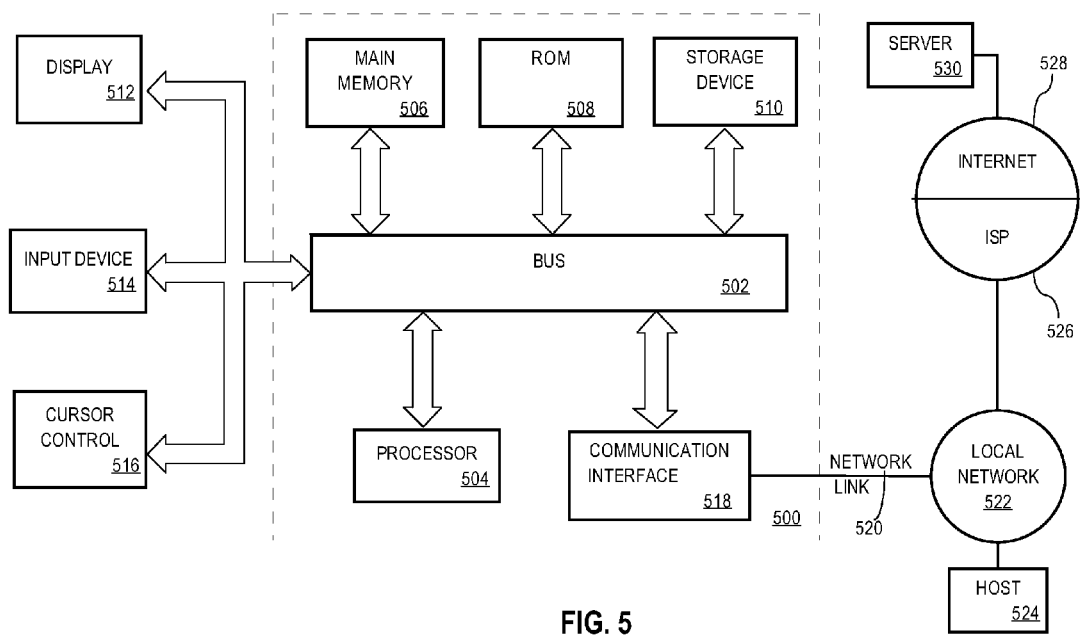
FIG. 5 illustrates a computer system upon which an embodiment may be implemented.

In an embodiment, each of the functional units of stream processing node computer 102 may be implemented using any of the techniques further described herein in connection with FIG. 5; for example, the stream processing node computer 102 may comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices and/or modules being communicatively coupled, each of the computers, devices, modules, logic, storage, and configurations may be communicatively coupled with each other.

Source node computer 192 and source node computer 194 may each be a router on a remote network, streaming source data to stream processing node computer 102. Additionally or alternatively, source node computer 192 and source node computer 194 may each be processing nodes receiving data from one or more upstream source nodes in the workflow.

Downstream node computer 198 may be a processing node computer downstream from stream processing node computer 102. Downstream node computer 198 may be a source computer to other downstream nodes not illustrated in the workflow.

Stream processing node computer 102 comprises source processing logic 110, input data store 115, derived data logic 130, derived data store 135, transaction mapping data store 150, and offline correction logic 160. While each of the components listed above are illustrated as included in a single computer, one or more of the components may be located, and/or executed on, one or more other computers communicatively coupled to stream processing node computer 102 and/or its components. Furthermore, while each of the modules, logic, and data stores listed above are illustrated as if separate units, one or more modules, logic, and/or data store may be combined. For example, input data store 115, derived data store 135, and transaction mapping data store 150 may be included in, and/or part of, the same persistent storage device.

2.2.1 Source Processing Logic

Source processing logic may be logic that processes one or more source streams from one or more source nodes. For example, source processing logic 110 may receive punctuations from source node computer 192 and source node computer 194, and generate and store one or more source transactions. Source processing logic 110 may receive one or more source records from source node computer 192 and source node computer 194, and assign each source record to one or more source transactions. Source processing logic 110 may determine based on receiving one or more punctuations, when each source record in a source transaction has been received. Source processing logic 110 may commit each source transaction, and all of its associated records, in persistent storage, such as in input data store 115.

Source processing logic may modify and/or send source records to derived data logic for processing. For example, source processing logic 110 may modify a source record to indicate which transaction(s) the source record belongs to by adding a transaction identifier, timestamp, and/or any other data to identify or determine which source transaction(s) and/or derived transaction(s) the source record is associated with and/or applies to. Source processing logic 110 may send the source records to derived data logic 130 for further processing.

2.2.2 Derived Data Logic

Derived data logic may be logic that receives a continuous query and perform one or more functions defined in the continuous query. For example, derived data logic 130 may receive a continuous query from a database module, a network monitoring system, and/or a user, such as a network administrator, defining one or more operations and/or conditions under which the operation should be performed. Derived data logic 130 may execute the continuous query accordingly.

Derived data logic may speculatively process source records and generate one or more derived records. Speculatively processing a source record may mean processing a source record without determining whether a source transaction that the source record belongs to has been received and/or committed.

Speculatively processing source records reduces the latency of the derived records sent to downstream nodes. For example, derived data logic 130 may receive a source record that is associated with a source transaction from source processing logic 110. Derived data logic 130 may process the source record, generate one or more new derived records based on the source record, and/or send the derived record to downstream node computer 198 before source processing logic 110 determines that the entire source transaction that the source record belongs to has been received and/or committed.

Derived data logic may determine the beginning and/or end of a derived transaction. For example, a continuous query may define when, and/or conditions under which a derived transaction should begin and/or end. In response to determining a new transaction should begin, derived data logic 130 may generate a new transaction identifier, and store the transaction identifier in transaction mapping data store 150. In response to determining a derived transaction should end, derived data logic 130 may commit the derived transaction and each derived record, if any, that is associated with, and/or was generated during, the derived transaction to derived data store 135.

Derived data logic may update a transaction mapping data store. For example, when a source record, which is associated with a particular source transaction, is received from source processing logic 110, derived data logic 130 may update transaction mapping data store 150 to indicate that one or more records from the particular source transaction were used to generate one or more derived records in the current derived transaction. Additionally or alternatively, a source processing logic, such as source processing logic 110, may update the transaction mapping data store to indicate that a source transaction, and/or a portion of a source transaction, was received during one or more derived transactions which are not yet committed.

Derived data logic may send derived punctuations and derived records to downstream nodes. For example, derived data logic 130 may send a beginning punctuation and an ending punctuation to downstream node computer 198 for each derived transaction generated.

2.2.3 Transaction Mapping Data Store

Nodes in the same workflow may generate transactions independently from each other. For example, a processing node computer may receive two source streams, each from a different source node computer. The first source node computer may generate transactions based on sending a particular number of records generated. The second node computer may generate transactions based on a first time interval. The processing node computer may generate transactions based on a second, different time interval. Thus, one or more source records from one or more source transactions may be used to generate a single derived transaction. Furthermore, a source record from a single source transaction may be used to generate one or more derived transactions.

A transaction mapping data store may be a collection of one or more records mapping one or more source transactions to one or more derived transactions. For example, transaction mapping data store 150 may include a record for each derived transaction previously committed and/or currently being generated. Additionally or alternatively, transaction mapping data store 150 may include a record for each source transaction committed and/or partially received. Additionally or alternatively, transaction mapping data store 150 may include data and/or one or more records that map one or more derived transactions to one or more source transactions. Additionally or alternatively, each record that corresponds with a source transaction may indicate whether the corresponding source transaction was committed or failed. Additionally or alternatively, each record that corresponds with a derived transaction may indicate whether the corresponding derived transaction should be regenerated.

2.2.4 Offline Correction Logic

Offline correction logic regenerates derived transactions that have been flagged. For example, offline correction logic 160 may query transaction mapping data store 150 for any derived transactions that should be regenerated. For each flagged derived transaction, offline correction logic 160 may delete the derived transaction in derived data store 135, regenerate the flagged derived transaction, and/or commit the regenerated derived transaction in derived data store 135. Offline correction logic 160 may clear a flag corresponding to a derived transaction after the derived transaction has been regenerated.

Offline correction logic may propagate regenerated derived transactions. For example, after regenerating and/or committing a particular derived transaction, offline correction logic 160 may send a notification to downstream node computer 198 indicating that the particular derived transaction was regenerated and is ready to be processed by downstream node computer 198. Downstream node computer 198 may download the regenerated transaction, and regenerate any derived transactions downstream node computer 198 generated based on the particular derived transaction.

For purposes of illustrating clear examples, offline correction logic 160 is illustrated and discussed herein as if it is a separate set of logic from derived data logic 130. However, in an embodiment, offline correction logic 160 and derived data logic 130 may be the same logic.

3.0 PROCESS OVERVIEW

Figure 2:
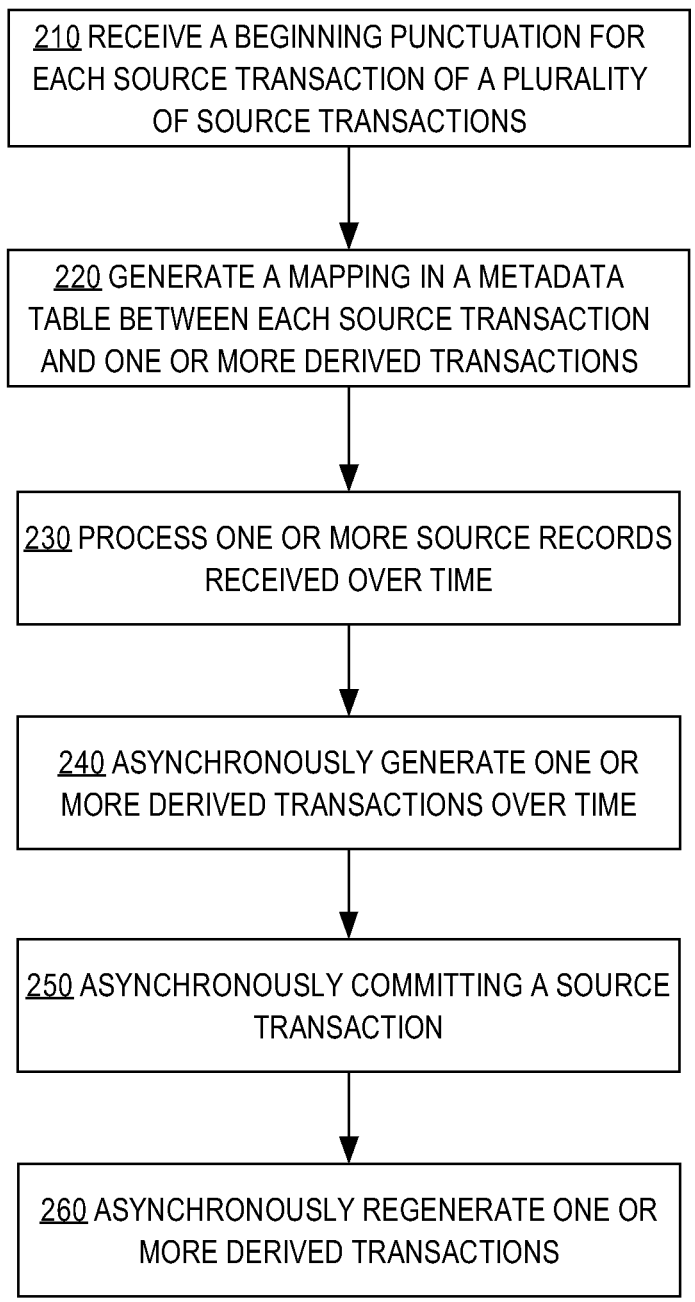
FIG. 2 illustrates a process for speculatively processing data and propagating corrections in a streaming workflow in an example embodiment.

FIG. 2 illustrates a process for speculatively processing data and propagating corrections in a streaming workflow in an example embodiment. For purposes of illustrating a clear example, assume the following facts: Source node computer 192 is a router for a first mission critical network and is executing a first continuous query. The first continuous query causes source node computer 192 to continuously send records downstream in the workflow to stream processing node computer 102 indicating an amount of data that has been sent and/or received through source node computer 192. Each record sent by source node computer 192 includes a timestamp indicating the time at which the data was sent and/or received, and a source transaction identifier that indicates the source transaction the record belongs to. The first continuous query causes source node computer 192 to generate a new source transaction every second. Source node computer 194 may also process the first continuous query and perform similarly. However, for purposes of illustrating clear examples, source node computer 194 is not discussed in all the examples below. Derived data logic 130 is executing a second continuous query that is a super query of the first continuous query. The second continuous query causes derived data logic 130 to compute the average throughput per network every two seconds.

3.1 Generating Transactions

In step 210, a processing node computer receives a beginning punctuation. For example, source processing logic 110 may receive a first beginning punctuation with a first source transaction identifier from source node computer 192. In response, source processing logic 110 may allocate memory on stream processing node computer 102 for the new source transaction.

In the current example, source processing logic 110 is receiving source transactions from source node computer 192 alone. However, source processing logic 110 may receive source transaction records from more than one source node computer, such as source node computer 194. To distinguish source transactions received from each source node computer, in response to receiving a beginning punctuation with an original source transaction identifier, source processing logic 110 may generate a new source transaction identifier, which may be based on the source node that the beginning punctuation was received from. For example, source processing logic 110 may generate a new source transaction identifier that includes the original transaction identifier, Internet Protocol address, name, model, and/or any other attribute associated with the source node the beginning punctuation was received from.

Source processing logic 110 may store a mapping in input data store 115, which maps each original source transaction identifier with a new source transaction identifier. In response to source processing logic 110 receiving a record and/or ending punctuation with an original source transaction identifier, source processing logic 110 may add the new source transaction identifier to the record and/or ending punctuation. Additionally or alternatively, the source processing logic 110 may change an original source transaction identifier in the record and/or ending punctuation to the new source transaction identifier.

In step 220, the processing node computer generates a transaction mapping. For purposes of illustrating a clear example, assume derived data logic 130 has created a first derived transaction, with a first unique derived transaction identifier, and a record that corresponds with the first derived transaction in transaction mapping data store 150. Source processing logic may send the first source transaction identifier to derived data logic 130. Derived data logic may generate a record that corresponds with the source transaction, and a mapping record that maps the first source transaction and the first derived transaction using the first source transaction identifier and the first derived transaction identifier. Derived data logic 130 may store the mapping record in transaction mapping data store 150.

3.2 Processing a Source Record

Figure 3:
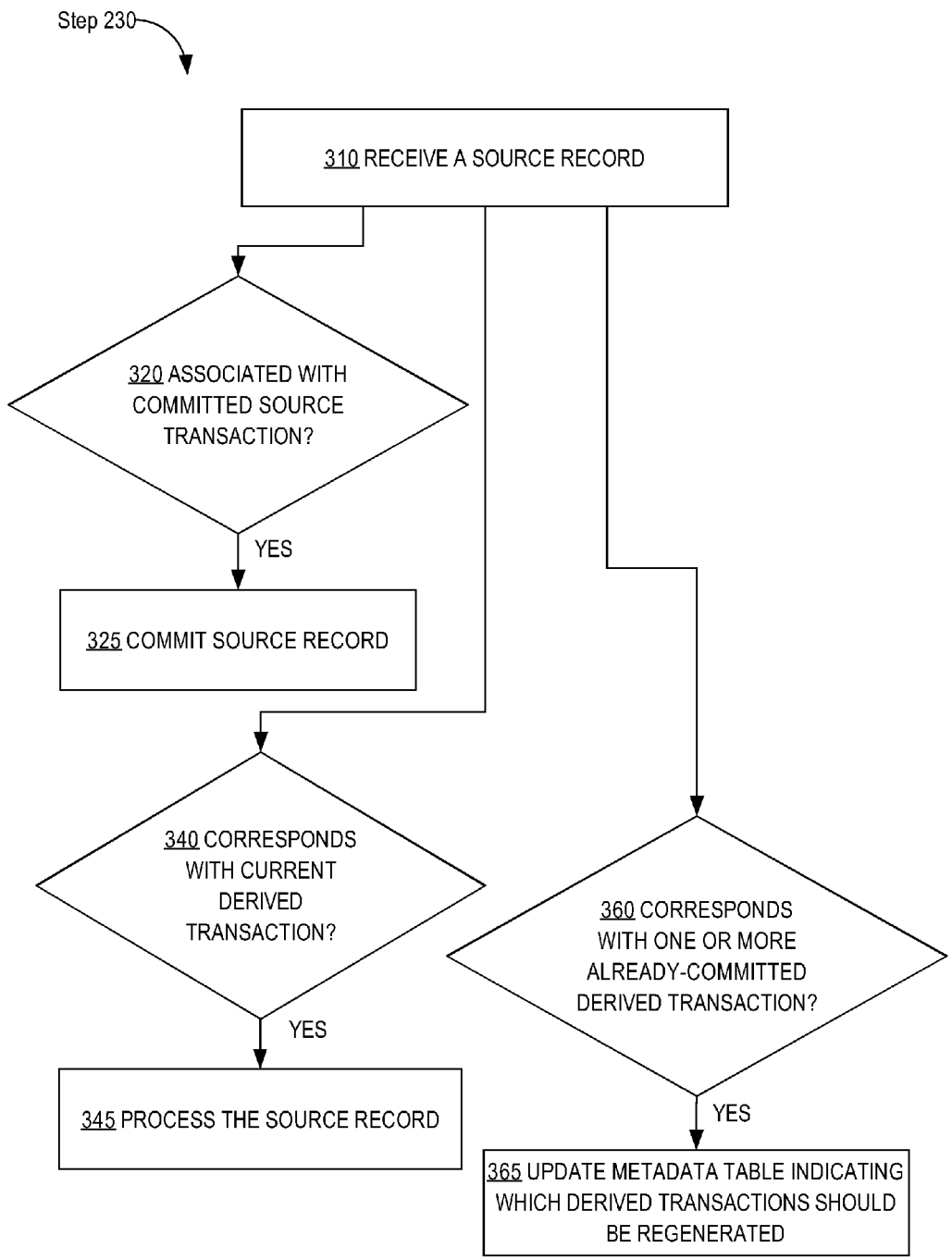
FIG. 3 illustrates a process for processing records in a streaming workflow in an example embodiment.

In step 230, the processing node processes one or more source records received over time. FIG. 3 illustrates a process for processing records in a streaming workflow in an example embodiment. Each of the steps 320, 340, and/or 360, and their subsequent steps, may be performed serially or in parallel. Each of the steps discussed herein may be repeated as each source record received. Since a processing node computer may process each source record as it is received, the stream processing node computer may reduce latency when it is time to generate, send, and/or commit one or more derived records and/or transactions.

In step 310, the processing node computer receives a source transaction. For example, source processing logic 110 may receive a record from source node computer 192.

In step 320, the processing node computer determines whether the record is "late". A source record may be late if the associated source transaction has already committed. Additionally or alternatively, a source record may be late if an earlier committed and/or sent derived transaction may have been based on the source record. For example, source processing logic 110 may query input data store 115 for an already-committed transaction with a source transaction identifier that matches the source transaction identifier in the record. If a committed transaction is found, then control may proceed to step 325, and commit the source record to an input data store. For example, source processing logic 110 may commit the received record in input data store 115 with the transaction identified in the source record.

Source processing logic 110 need not determine whether to regenerate a derived transaction if source processing logic 110 receives a late record, because the boundaries of a derived transaction may be independent of source transaction boundaries. Thus, even if a source record is received after the associated source transaction is committed, derived data logic 130 may still process the record if it matches the criteria for the current open derived transaction.

In step 340, the processing node determines whether the source record corresponds with a derived transaction currently being processed. A source record may correspond with a derived transaction if the source record satisfies the condition(s) for a derived transaction, which are defined in the continuous query that derived data logic 130 is currently processing.

In the current example, the source record has a timestamp, and the currently open derived transaction has a particular start time and an end time defined by the continuous query. Derived data logic 130 may determine whether the source record satisfies the condition(s) of a derived transaction, if the timestamp in the source record is within the period defined by the start time and end time. If so, then derived data logic 130 may proceed to step 345.

In this example, the continuous query defines the boundaries of each derived transaction by a time interval. However, a continuous query may define boundaries of derived transactions by one or more other conditions.

In step 345, the processing node computer processes the source record. For example, derived data logic 130 may update a value that represents the total amount of data send and/or received by source node computer 192 during the currently open derived transaction. Additionally or alternatively, derived data logic 130 may generate a derived record indicating the current total amount, and/or the average amount, of data sent and/or received by source node computer 192 during the current derived transaction. Additionally or alternatively, derived data logic 130 may update transaction mapping data store 150 to indicate that one or more source records in the source transaction were used to generate the current derived transaction.

In step 360, the processing node determines whether the source record corresponds with one or more previously derived transactions. For example, source processing logic 110 may, if needed, send the source record to derived data logic 130. Derived data logic 130 may query transaction mapping data store 150 for mappings with the source transaction identifier. If any of the mappings indicate that one or more previously committed derived transactions were based on a source transaction that matches the record's source transaction identifier, then control may proceed to step 365.

In step 365, the processing node updates the transaction mapping data store to indicate which derived transactions, if any, should be regenerated. Derived data logic 130 may mark each of the one or more previously committed derived transactions in step 360 to be regenerated.

As discussed herein, derived transaction boundaries may be independent of source transaction boundaries. Thus, a source transaction's boundaries can span one or more derived transaction's boundaries and vice versa. Accordingly, transaction mapping data store 150 may map a particular source transaction to one or more derived transactions. However, a single record in the particular source transaction need not affect each of the one or more mapped, derived transactions. Thus, derived data logic 130 may determine which of the one or more mapped, derived transactions the record may apply to and mark those transactions to be regenerated, without marking the rest of the one or more derived transaction(s), if any, to be regenerated.

In the example embodiment illustrated in FIG. 3, one or more derived transactions may overlap; thus, step 360 may be performed regardless of the outcome of step 340. However, in an embodiment, each derived transaction need not overlap, in which case, if a source record satisfies the conditions for an open derived transaction, then control need not proceed to step 360 or step 365.

3.3 Generating Derived Transactions

Returning now to FIG. 2, in step 240, the processing node asynchronously generates one or more derive transactions over time. As discussed herein, derived transaction boundaries may be determined by a continuous query and/or one or more other factors, and may be independent of any source transaction boundaries. For example, derived data logic 130 may determine that a particular amount of time has elapsed since the beginning of a derived transaction. In response derived data logic 130 may generate and/or send one or more derived records to downstream node computer 198. Additionally or alternatively, derived data logic 130 may generate and/or send an ending punctuation to downstream node computer 198 with an identifier that matches the previously sent, corresponding beginning punctuation. Additionally or alternatively, derived data logic 130 may commit the derived transaction to derived data store 135. Additionally or alternatively, derived data logic 130 may update transaction mapping data store 150 to indicate the derived transaction was committed and/or which source transaction(s) were processed to generate the committed derived transaction.

To reduce latency for time-sensitive workflows, derived data logic 130 may speculatively generate, send, and/or commit the one or more derived records and/or derived transactions. Derived data logic 130 need not determine whether one or more source transactions failed, which many cause the derived transaction to be regenerated later. Accordingly, derived data logic 130 need not wait for potentially late source records.

When a derived transaction ends, the processing node may open a new derived transaction. For example, derived data logic 130 may generate a new unique derived transaction identifier. Additionally or alternatively, derived data logic 130 may reset its state. Additionally or alternatively, derived data logic 130 may send a new beginning punctuation to downstream node computer 198 with the new unique derived transaction identifier. Additionally or alternatively, derived data logic 130 may prepare transaction mapping data store 150 for the new transaction by generating a new record that corresponds to the new opened derived transaction. The new record may include the new unique derived transaction identifier, which may be mapped to one or more source transactions used to speculatively generate one or more derived records in the new derived transaction.

3.4 Committing a Source Transaction

Returning now to FIG. 2, in step 250, the processing node asynchronously commits the source transaction. For example source processing logic 110 may receive an ending punctuation from source node computer 192 that corresponds with an open source transaction based on a source transaction identifier. In response, source processing logic 110 may commit the source transaction, including any source records associated with the source transaction, if any, into input data store 115.

3.5 Determining a Source Transaction has Failed

If an ending punctuation is not received in a timely fashion, then the processing node computer may determine that the source transaction failed. For example, if a threshold amount of time passes from the time a beginning punctuation was received and/or a source record was received, then source processing logic 110 may determine that the source transaction that corresponds to the beginning punctuation failed. Additionally or alternatively, source processing logic 110 may receive an error signal from source node computer 192, which indicates the current source transaction, and/or source node computer 192, has failed.

The threshold amount of time may be set by a continuous query, data in the beginning punctuation, and/or input from a user. For example, the continuous query the processing node is executing may define the threshold time to be ten seconds. Also for example, a beginning punctuation may indicate that a corresponding ending punctuation should be received within fifteen seconds.

An ending punctuation may not be received for many reasons. For example, the source node computer 192 may be shutdown, a user may terminate the continuous query executing on source node computer 192 due to user input, competing resources, and/or any other reason.

In response to determining that a source transaction has failed, the processing node computer may flag one or more derived transactions to be regenerated. For example, in response to determining that an open source transaction has failed, source processing logic 110 may flag each derived transaction with a mapping to the failed source transaction in transaction mapping data store 150.

Flagging a derived transaction may mean setting a value in a record in transaction mapping data store 150 that corresponds with the derived transaction. Additionally or alternatively, flagging a derived transaction may mean sending a derived transaction identifier to offline correction logic 160, indicating that offline correction logic 160 should regenerate the derived transaction that corresponds with the derived transaction identifier.

3.6 Regenerating Derived Transactions

Returning now to FIG. 2, in step 260, the processing node asynchronously regenerates one or more derive transactions over time. For example, offline correction logic 160 may regenerate flagged, derived transactions if one or more central processing units (CPUs) and/or other computer resources are not being used. Additionally or alternatively, offline correction logic 160 may check for and/or regenerate flagged, derived transactions periodically. Additionally or alternatively, offline correction logic 160 may check for and/or regenerate flagged, derived transactions in response a request from downstream node computer 198 and/or any other logic, module, and/or computer.

Figure 4:
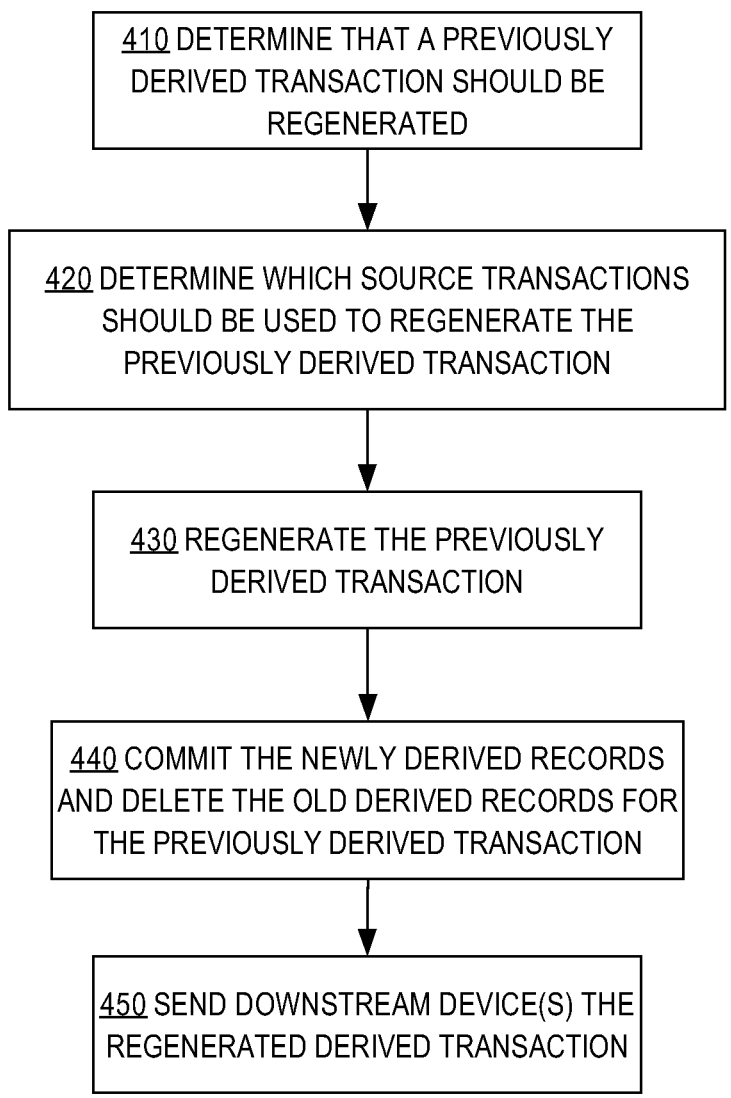
FIG. 4 illustrates a process for updating derived transactions, and propagating the derived transaction throughout a workflow in an example embodiment.

FIG. 4 illustrates a process for updating derived transactions, and propagating the derived transaction throughout a workflow in an example embodiment. In step 410, the processing node determines that a previously derived transaction should be regenerated based on one or more transaction mappings. For example, offline correction logic 160 may query transaction mapping data store 150 for flagged transactions. For purposes of illustrating a clear example, assume that a particular derived transaction, with a particular derived transaction identifier is flagged.

In step 420, the processing node determines which source transactions should be used to regenerate the previously derived transaction. For example, offline correction logic 160 may query transaction mapping data store 150 for mapping between the particular derived transaction and one or more committed source transactions. For purposes of illustrating a clear example, assume transaction mapping data store 150 returns two mappings to offline correction logic 160, which map the particular derived transaction to two source transaction. Also assume that the first source transaction was committed, but the second source transaction failed. The first mapping may indicate that the first source transaction was committed, but the second mapping may indicate that the second source transaction failed. Additionally or alternatively, offline correction logic 160 may query for the two source transactions in input data store 115. Since the first source transaction was committed and the second source transaction failed, then input data store 115 may return the first source transaction, but not the second source transaction In step 430, the processing node regenerates the previously derived transaction. For purposes of illustrating a clear example, assume the previously derived transaction was generated according to a particular continuous query with one or more conditions. Offline correction logic 160 may determine which source records, if any, in the committed source transaction(s) satisfy the condition(s) in the continuous query. Offline correction logic 160 may regenerate the derived transaction, by processing the source records that satisfy the continuous query condition(s), and generating one or more new derived records according to the continuous query.

In step 440, the processing node commits the newly derived records and deletes the old derived records for the previously derived transaction. For example, offline correction logic 160 may commit the one or more new derived records from step 430 to derived data store 135. Offline correction logic 160 may also delete the previously derived records from derived data store 135.

In step 450, the processing node sends downstream device(s) the regenerated derived transaction. For purposes of illustrating a clear example, assume that downstream node computer 198 has the same modules, logic, and storages as stream processing node computer 102. Offline correction logic 160 may send a source processing logic in downstream node computer 198 the regenerated transaction. The receiving source processing logic in downstream node computer 198 may commit the newly received regenerated transaction in the input data store on downstream node computer 198. The receiving source processing logic may determine which downstream derived transactions downstream node computer 198 generated based on the newly committed transaction. The offline correction logic in downstream node computer 198 may regenerate the downstream derived transactions, and send those regenerated transaction to further downstream device(s) accordingly, and so on. Thus, the downstream devices in the streaming workflow are recursively updated.

Additionally or alternatively, offline correction logic 160 may send a notification to downstream node computer 198 indicating that the particular derived transaction was regenerated and is ready to be processed by downstream node computer 198. In response, downstream node computer 198 may delete one or more downstream transactions that downstream node computer 198 generated based on the transaction identified in the notification. Downstream node computer 198 may download the regenerated transaction, and regenerate one or more downstream transactions based on the particular derived transaction.

In an embodiment, mappings that map a derived transaction to one or more failed source transactions may be deleted. For example, after a derived transaction is regenerated, any mappings in transaction mapping data store 150 that map the derived transaction to one or more failed source transactions may be deleted. However, in an embodiment, mappings that map the derived transaction to one or more failed source transactions need not be deleted. Thus, if a previously failed source transaction is later received, then the mapped derived transaction may be regenerated using the received source transaction.

In an embodiment, the processing node may determine whether a particular derived transaction needs to be regenerated in response to a request for the particular derived transaction from a downstream node. The processing node may regenerate the particular derived transaction and send the regenerated derived transaction to the downstream node.

3.7 Recovering for Processing Node Failure

A processing node may fail and lose state and use the committed derived transactions to regain state. For purposes of illustrating a clear example, assume stream processing node computer 102 computes a rolling average of the throughput per network every ten minutes in addition to computing the average throughput per network every two seconds. If stream processing node computer 102 goes offline, when stream processing node computer 102 comes back online, then derived data logic 130 may regain state by processing any derived transactions committed to derived data store 135 within the last ten minutes.

A processing node may request missed source transactions from one or more source nodes. For example, source processing logic 110 may request any source transactions that source node computer 192 generated, if any, while stream processing node computer 102 was offline.

A processing node may use transaction mappings to recover partial state. For example, derived data logic 130 may query transaction mapping data store 150 for any committed source transactions that were used to generate the derived transaction that was interrupted when stream processing node computer 102 went offline. Derived data logic 130 may request the committed source transactions from input data store 115 either directly or through one or more other components, such as source processing logic 110. For each source transaction that was not committed in input data store 115, derived data logic 130 may cause source processing logic 110 to request the uncommitted source transaction from source node computer 192 using the uncommitted source transaction's identifier stored in transaction mapping data store 150.

4.0 ADDITIONAL EXAMPLES ACCORDING TO AN EXAMPLE EMBODIMENT

For purposes of illustrating another clear example according to a different example embodiment, assume the following: a processing node computer receives source records in the form of <A, B>, wherein A is a value and B is a timestamp. The source records are from two source streams: S1 and S2. S1 comprises the following records, which are received by the processing node computer from a first source node computer in the following order: <A1, 09:10>, <A2, 09:29>. S2 comprises the following records, which are received by the processing node computer from a second source node computer in the following order: <A3, 09:05>, <A4, 10:02>. The processing node computer produces derived records every hour in the form of <X, Y>, wherein Y is a time range, and X is the sum of the values received in the time range. A time range may be in the form of (K–L], wherein K is a first timestamp and is not included in the range, and L is a second time and is included in the range. For example, the time range for a ten o'clock hour may be denoted as (09:00-10:00]. The processing node computer determines time by the timestamps in the source records as each source record is received. For example, when derived data logic 130 receives the source record <A2, 09:45>, then the processing node computer may determine that the current time is 09:45.

In response to receiving <A1, 09:10> in S1, the processing node computer may create a first derived record <A1, (09:00-10:00]>, which is referred to herein as DR1. The processing node computer may create and store a transaction mapping in a transaction mapping data store, which may comprise persistent storage. The transaction mapping may be represented herein as <DR1, [S1], (09:00-10:00], BEGIN>, wherein the stream(s) referenced in the square brackets are the stream(s) with one or more records that were processed to generate DR1. Additionally or alternatively, the processing node computer may send a first beginning punctuation, which includes the range (09:00-10:00], to a downstream device.

BEGIN is an example flag that may be used to indicate that the derived transaction, which includes DR1, is open, but has not ended yet. The flag may be a Boolean value, integer, and/or any other value to indicate the state of the corresponding derived transaction.

In response to receiving <A2, 09:29> in S1, the processing node computer may update DR1 to be <A1+A2, (09:00-10:00]>. For purposes of illustrating a clear example, assume that S1 ends as expected without any errors. In response, the processing node computer may commit S1, by committing each record received in S1 to persistent storage.

In response to receiving <A3, 09:05> in S2, the processing node computer may update DR1 to be <A1+A2+A3, (09:00-10:00]>. Furthermore, because the processing node computer has not processed a record in S2 for DR1 before, the processing node computer may update the corresponding transaction mapping to be <DR1, [S1, S2], (09:00-10:00], BEGIN>.

In response to receiving <A4, 10:02> in S2, the processing node computer may determine that the time is 10:02, which is beyond the range of DR1. Accordingly, the processing node computer may send DR1 to one or more downstream devices. The processing node computer may update the corresponding transaction mapping to be <DR1, [S1, S2], (09:00-10:00], END>. The processing node computer may commit DR1 to persistent storage. The processing node computer may send DR1 and/or a first ending punctuation that corresponds to the first beginning punctuation to one or more downstream devices.

END is an example flag that may be used to indicate that the derived transaction has finished. Additionally or alternatively, the END flag may indicate the derived transaction and is, and/or should be, committed to persistent storage and/or send to one or more downstream devices. The flag may be a Boolean value, integer, and/or any other value to indicate the state of the corresponding derived transaction.

4.1 Reconciling a Failed Source Stream

A processing node computer may reconcile derived transactions when a source stream fails. For purposes of illustrating a clear example, assume that the processing node computer determines that S2 fails. In response, the processing node computer need not commit S2, and/or the records that were received in S2, to persistent storage. The processing node computer may update any transaction mappings that referenced S2 to indicate that the derived transaction(s) should not be based on S2, and that the derived records associated with the derived transaction(s) should be regenerated. Accordingly, the processing node computer may update the transaction mapping that corresponds with DR1 to be <DR1, [S1], (09:00-10:00], REGENERATE>, indicating DR1 should be regenerated based on S1. The processing node computer may delete DR1 from persistent storage. The processing node computer may regenerate and recommit DR1 as <A1+A2, (09:00-10:00]>, based on one or more source records in S1 committed in persistent storage.

REGENERATE is an example flag that may be used to indicate that the derived transaction should be regenerated.

However, the flag may be a Boolean value, integer, and/or any other value to indicate the state of the corresponding derived transaction. In an embodiment the derived transaction mapping may be <DR1, [S1], (09:00-10:00], END, REGENERATE>, which indicates that the transaction finished and was committed to persistent storage, but should be regenerated. The processing node computer may use the committed source transaction(s), which in this example is S1, to regenerate DR1.

In an embodiment, in response to determining that S2 failed, the processing node computer may update the transaction mapping to be <DR1, [S1, S2], (09:00-10:00], REGENERATE>. The source record(s) in S2 were not committed because S2 failed. Thus, even though S2 is still included in the transaction mapping, the regenerated DR1 need not be regenerated using S2 because the source record(s) in S2 were not committed to persistent storage.

4.2 Recovering from System Failure

A processing node computer may recover from a system failure by regenerating the open derived transaction(s) using transaction mappings. For purposes of illustrating a clear example, assume the following facts: The processing node computer lost power and failed after processing <A1, 09:10> and <A2, 09:29> in S1 and <A3, 09:05> in S2. S1 finished successfully before the processing node computer failed, and S1 was committed to persistent storage. S2 had not finished when the processing node computer failed, and S2 was not committed to persistent storage. The current transaction for DR1 was still open and not committed because <A4, 10:02> had not been received and/or processed before the processing node computer failed. The transaction mapping that corresponds to DR1 is <DR1, [S1, S2], (09:00-10:00], BEGIN>.

After the processing node computer is resumed, the processing node computer determines which transaction(s) were incomplete when the processing node computer failed. In response to determining that the transaction mapping for DR1 does not have the END flag, the processing node computer may regenerate DR1 based on the source transaction(s) included in the transaction mapping and persistently stored, which in this example is S1, but not S2. Additionally or alternatively, in response to determining that the DR1 mapping exists, but DR1 is not found in persistent storage, then the processing node computer may regenerate DR1 based on the source transaction(s) included in the transaction mapping and persistently stored, which in this example is S1, but not S2. Additionally or alternatively, the processing node computer may update the transaction mapping to remove S2. In an embodiment, the transaction mapping may be updated by deleting the previous transaction mapping and creating a new transaction mapping. In an embodiment, the processing node computer may regenerate each of the one or more open, uncommitted derived transactions before receiving and/or processing a new source record and/or source transaction.

In an embodiment, the processing node computer may determine that S2 was not committed before the processing node computer failed. In response, the processing node computer may request S2 from the second source computer.

4.3 Reconciling a Late Source Record

A processing node computer may reconcile derived transactions when a late source record is received. For purposes of illustrating a clear example of reconciling a late source record, assume the following: The processing node computer received, processed, and committed S1 and S2. The processing node computer committed DR1 as <A1+A2+A3, (09:00-10:00]>, and generated the following corresponding transaction mapping: <DR1, [S1, S2], (09:00-10:00], END>. The processing node computer receives a third stream, S3, which includes two records, <A5, 09:45> and <A6, 10:01>.

In response to receiving <A5, 09:45> in S3, the processing node computer may create a second derived record <A5, (09:00-10:001>, which is referred to herein as DR2. The processing node computer may create a transaction mapping in the transaction mapping store. The transaction mapping may be represented herein as <DR2, [S3], (09:00-10:00], BEGIN>. The processing node computer may send a second beginning punctuation, which includes the range (09:00-10:00], to a downstream device.

In response to receiving <A6, 10:02> in S2, the processing node computer may determine that the time is 10:01, which is beyond range of DR2. Accordingly, the processing node computer may send DR2 to one or more downstream devices. The processing node computer may update the corresponding transaction mapping to be <DR2, [S3], (09:00-10:00], END>. The processing node computer may commit DR2 to persistent storage. The processing node computer may send DR2 and/or a second ending punctuation that corresponds to the second beginning punctuation to one or more downstream devices.

DR2 may be merged with DR1. For example, after DR2 is committed, the processing node computer may generate a single derived record <A1+A2+A3+A5, (09:00-10:00]>, referred to herein as DR3, which represents the sum of all the transactions with the same period, which in this example is DR1 and DR2. The processing node computer may generate the following corresponding transaction mapping: <DR3, [S1, S2, S3], (09:00-10:00], END>, which combines the sources listed in the transaction mappings for each derived record DR1 and DR2. The processing node computer may delete DR1 and/or DR2. The processing node computer may delete the corresponding transaction mappings for DR1 and DR2. In response to a request from a downstream device for a transaction with a range (9:00-10:00], the processing node computer may send DR3 to the downstream device.

5.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer system comprising:
a memory;
a processor coupled to the memory;
processing logic coupled to the memory and the processor and configured to:
receive a plurality of source data records from one or more source computers, wherein one or more first source data records are associated with a first source transaction and one or more second source data records are associated with a second source transaction;
generate a first derived transaction including one or more first derived records based on the plurality of source data records;
generate a first transaction mapping between the first derived transaction and the first source transaction;
generate a second transaction mapping between the first derived transaction and the second source transaction;
determine that the first derived transaction has ended, and in response, commit first derived transaction including the one or more first derived records to a persistent storage;
receive a first ending punctuation associated with the first source transaction, and in response, commit the first source transaction including the one or more first source data records associated with the first source transaction to the persistent storage;
after committing the first derived transaction, determine that the second source transaction failed, and in response:
determine that the first derived transaction should be regenerated based on the second transaction mapping, and in response, regenerate the first derived transaction by:
generating one or more second derived records that are based on the one or more first source data records but not the one or more second source data records;
committing the one or more second derived records to the persistent storage.

2. The computer system of claim 1, wherein the processing logic is configured to send, in response to determine that the first derived transaction has ended, the one or more first derived records to a downstream device without determining that the second source transaction has failed.

3. The computer system of claim 1, wherein the processing logic is configured to:
receive a first beginning punctuation associated with the first source transaction from a first source computer, wherein the one or more first source data records are received from the first source computer;
in response to receiving the first ending punctuation, update the first transaction mapping to indicate that the first source transaction is complete.

4. The computer system of claim 1, wherein after committing the one or more first derived records, the processing logic is configured to:
receive a late source record that is associated with the first source transaction;
determine that the late source record could have been processed with the first derived transaction based on the first transaction mapping between the first source transaction and the first derived transaction, and in response, flag the first derived transaction to be regenerated.

5. The computer system of claim 1, wherein the processing logic is configured to:
associate each record of the one or more first derived records with the first derived transaction;
in response to determining that the second source transaction failed, delete each record associated with the first derived transaction from the persistent storage.

6. The computer system of claim 1, wherein the processing logic is configured to send, after regenerating the first derived transaction, the one or more second derived records to a downstream device.

7. The computer system of claim 1, wherein the processing logic is configured to:
associate the one or more first derived records with an identifier that identifies the first derived transaction;
in response to determining that the first derived transaction has ended, send the one or more first derived records to a downstream device with the identifier;
in response to determining that the second source transaction failed and generating the one or more second derived records:
associate the one or more second derived records with the identifier;
notify the downstream device that the first derived transaction, which is associated with the identifier, was regenerated.

8. The computer system of claim 1, wherein the processing logic is configured to receive a request for the first derived transaction, and in response, determine whether the first derived transaction should be regenerated.

9. The computer system of claim 1, wherein the processing logic is configured to:
associate an identifier with the first derived transaction;
in response to determining that the first derived transaction has ended, send the one or more first derived records to a downstream device with the identifier;
associate the one or more second derived records with the identifier;
subsequent to generating the one or more second derived records:
receive a request with the identifier from the downstream device;
in response to receiving the request, send the one or more second derived records to the downstream device, but not the one or more first derived records.

10. A method comprising:
receiving a plurality of source data records from one or more source computers, wherein one or more first source data records are associated with a first source transaction and one or more second source data records are associated with a second source transaction;
generating a first derived transaction comprising one or more first derived records based on the plurality of source data records;
generating a first transaction mapping between the first derived transaction and the first source transaction;
generating a second transaction mapping between the first derived transaction and the second source transaction;
determining that the first derived transaction has ended, and in response, committing first derived transaction including the one or more first derived records to a persistent storage;

receiving a first ending punctuation associated with the first source transaction, and in response, committing the first source transaction including the one or more first source data records associated with the first source transaction to the persistent storage;

after committing the first derived transaction, determining that the second source transaction failed, and in response:

determining that the first derived transaction should be regenerated based on the second transaction mapping, and in response, regenerating the first derived transaction by:

generating one or more second derived records that are based on the one or more first source data records but not the one or more second source data records;

committing the one or more second derived records to the persistent storage;

wherein the method is performed by one or more computing devices.

11. The method claim 10 comprising, in response to determining that the first derived transaction has ended, sending the one or more first derived records to a downstream device without determining that the second source transaction has failed.

12. The method of claim 10 comprising:
receiving a first beginning punctuation associated with the first source transaction from a first source computer, wherein the one or more first source data records are received from the first source computer;

in response to receiving the first ending punctuation, updating the first transaction mapping to indicate that the first source transaction is complete.

13. The method of claim 10 comprising:
after committing the one or more first derived records, receiving a late source record that is associated with the first source transaction;

determining that the late source record should have been processed with the first derived transaction based on the first transaction mapping between the first source transaction and the first derived transaction, and in response, flagging the first derived transaction to be regenerated.

14. The method of claim 10 comprising:
associating each record of the one or more first derived records with the first derived transaction;

in response to determining that the second source transaction failed, deleting each record associated with the first derived transaction from the persistent storage.

15. The method claim 10 comprising, after regenerating the first derived transaction, sending the one or more second derived records to a downstream device.

16. The method of claim 10 comprising:
associating the one or more first derived records with an identifier that identifies the first derived transaction;

in response to determining that the first derived transaction has ended, sending the one or more first derived records to a downstream device with the identifier;

in response to determining that the second source transaction failed and generating the one or more second derived records:

associating the one or more second derived records with the identifier;

notifying the downstream device that the first derived transaction, which is associated with the identifier, was regenerated.

17. The method of claim 10 comprising receiving a request for the first derived transaction, and in response, determining whether the first derived transaction should be regenerated.

18. The method of claim 10 comprising:
associating an identifier with the first derived transaction;

in response to determining that the first derived transaction has ended, sending the one or more first derived records to a downstream device with the identifier;

associating the one or more second derived records with the identifier;

subsequent to generating the one or more second derived records:

receiving a request with the identifier from the downstream device;

in response to receiving the request, sending the one or more second derived records to the downstream device, but not the one or more first derived records.

* * * * *